United States Patent [19]

Jacobs

[11] 4,310,986
[45] Jan. 19, 1982

[54] GAME CALL

[76] Inventor: Trigg R. Jacobs, Rte. #3, Box 489, El Dorado, Ark. 71730

[21] Appl. No.: 202,768

[22] Filed: Oct. 31, 1980

[51] Int. Cl.³ ............................................. A63H 5/00
[52] U.S. Cl. ..................................................... 46/189
[58] Field of Search .................... 46/189, 174, 175 R, 46/192, 177; 84/402, 410

[56] References Cited

U.S. PATENT DOCUMENTS

| | | | |
|---|---|---|---|
| 2,958,157 | 11/1960 | Tannehill | 46/189 X |
| 3,208,184 | 9/1965 | Wisor | 46/189 |
| 3,716,943 | 2/1973 | Orzetti | 46/189 |
| 4,041,639 | 8/1977 | Funk | 46/189 |

*Primary Examiner*—Robert Peshock
*Assistant Examiner*—Mickey Yu
*Attorney, Agent, or Firm*—Colton & Stone, Inc.

[57] ABSTRACT

A game call having a sounding board covering the sounding chamber of a sound block to facilitate in the production of tones imitating the call of a wild turkey. The call is composed of two sections interfitted so that the vibratory peg extending from the sound block rests securely on a groove machined on the front and of the sound box for compact carrying and protection from damage.

7 Claims, 5 Drawing Figures

U.S. Patent    Jan. 19, 1982    4,310,986
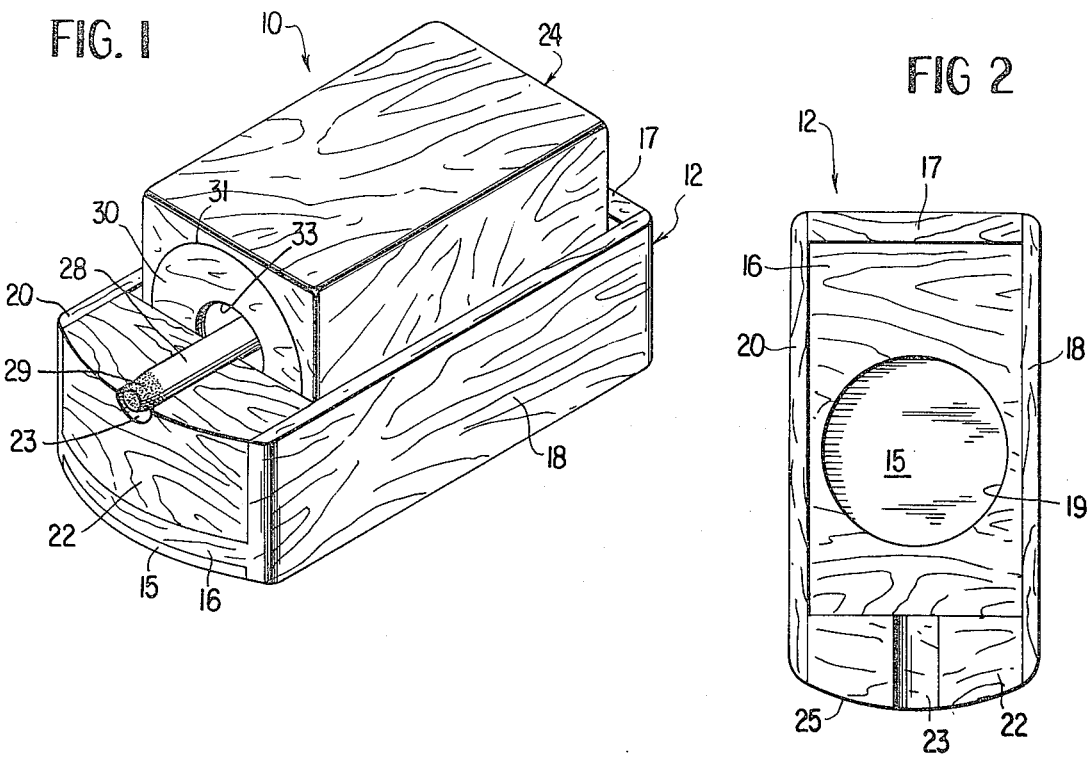
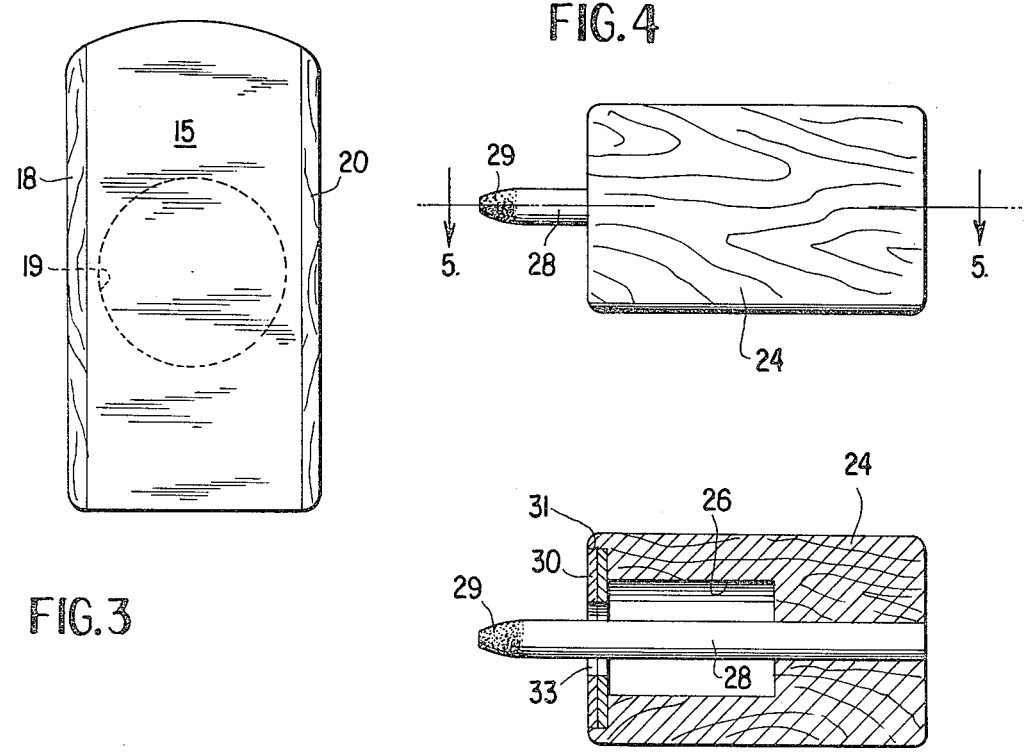

GAME CALL

BACKGROUND OF THE INVENTION

The disclosed game call is of the well known strike type and is used by hunters or wild bird seekers to generate sound imitating the calls of wild birds to attract the birds.

Turkey calls of the type using a sounding block where a vibrating peg extends outwardly of a surrounding bore and includes a striking point are shown in the U.S. patents to Tannehill, U.S. Pat. No. 2,958,157; Widsor, U.S. Pat. No. 3,208,184; and Orzetti, U.S. Pat. No. 3,716,943. Game calls wherein one side of the sound box is recessed and filled with a slate striking surface extending the length of the bottom while the inner side of the box is flat with a circular aperture are disclosed in the U.S. patents to Tannehill, U.S. Pat. No. 2,958,157 and Funk, U.S. Pat. No. 4,041,639. The concept of nesting a sound block inside a sound box for compact interfitting is also well known in the prior art. Such a game call is manufactured by Lee Calls of Coffeeville, Alb.

BRIEF DESCRIPTION OF THE INVENTION

It is an object of the present invention to provide improvements relating to the production of sound generated from a game call. The upper member or sounding block of the game call is hollow for the major portion of the length thereof, the vibrator element being secured in the closed end of the block and the free end projecting a distance beyond the open end of the block whereby the vibratory peg has a substantial portion of its length enclosed within the hollow portion of the block, enabling the peg to vibrate freely within the hollow portion and thus produce variations of sound. The present invention encloses the sound chamber with a thin waffer or sound board made of veneer sheets cross-banded. The sound board may also be made of any other suitable material such as plastic or wood. It is the closing of the sound chamber that gives a more authentic sound and also produces a more raspy yelp or imitation of the call of a wild turkey.

It is also an important object of the invention to provide a novel interfitting of the sound block and sound box. The sound box features a groove machined on the front end to allow the peg extending from the sounding block to rest on the groove while the sounding block fits squarely inside the sounding box.

Other objects and advantages of the invention will become apparent as the description proceeds, especially when taken in conjunction with the accompanying drawings illustrating the invention.

BRIEF DESCRIPTION OF THE DRAWINGS

In the drawings:

FIG. 1 is a perspective view of the game call of the present invention;

FIG. 2 is a top plan view of the sound box;

FIG. 3 is a bottom plan view of the sound box;

FIG. 4 is a top plan side view of the sound block; and

FIG. 5 is a cross-sectional view of the sound block taken along line 5—5 of FIG. 4.

DETAILED DESCRIPTION OF THE PREFERRED EMBODIMENT

Game call 10 includes a sound box comprised of an open-topped wooden box having a bottom wall 16, side walls 18 and 20, a rear wall 17 and a front wall 22. The front wall 22 is of greater thickness than the side and rear walls, has a rounded front face 25 to fit comfortably in the palm of the user's hand and is provided with a semicylindrical groove 23 on its upper surface, the groove being on the longitudinal centerline of the box. The bottom wall 16 of the box is inset from the lower ends of the side walls 18 and 20 to provide a recess extending the length of the box and a slate striking plate 15 is secured in this recess. A circular aperture 19 is formed in the bottom wall 16, centered between the side walls and end walls.

The second component of the game call 10 is a sound block, designated generally by the numeral 24, which consists of a wooden block of rectangular plan and square cross-section. A cylindrical bore 26 extends inwardly from one end face of the block to a depth of from one-half to two-thirds the length of the block. A wooden dowel 28 is secured within the unbored end of the block, extends coaxially through the bore 26 and projects from the open end thereof, terminating in a rounded, fire-hardened tip 29. At the forward end of the bore 26, the block is counterbored to provide a recess 31 in which is secured an annular sounding board 30. The central aperture 33 of the sounding board is approximately one-half the diameter of the bore 26. Preferably, the sounding board is formed of two layers of wood veneer cross-banded to one another. Other materials may be used, however, including plastics and plastic laminates such as Formica brand plastic laminate (a product of the Formica Corporation).

The game call is small and easily carried in the field in that block 24 nests inside box 12. Sandpaper or some other sheet for smoothing the slate may be stored flat against the floor for convenient carrying on the hunt in case the slate surface needs to be resmoothed. A rubber band may be slipped around the game call to prevent the sound block from falling out of the sound box when the device is accidentally turned upside down during storage or while in pursuit of the wild birds.

To operate the game call sound block 24 is removed from sound box 12. The sound box is turned over to the slate bottom and held in hand so that the tips of user's fingers press against one side while the thumb secures the other side and the rear wall. The top of the thumb and tips of fingers should form a cup under the sound box leaving an opening between the user's palm and the front wall of the sound box. Vibratory peg is rubbed across the slate portion that overlies the circular aperture of the sound box floor. This rubbing creates a vibration sound that is altered by the sound board producing a double note of the turkey call. The call is determined by the way in which the user moves the striking point across the slate surface. When the striking point is rubbed across the slate surface at a position other than the circular aperture a different sound will result. Tones may also be varied by holding the sound box tightly or loosely and by holding the box closer to the body. When the sound box is held loosely to the body it produces a coarse tone like a gobbler whereas held tightly it produces a fine tone like a hen.

It should be understood that while a preferred embodiment of the invention has been described in detail, the invention is not limited to the specifically described embodiment. Reference should be had to the following claims in determining the true scope of the invention.

What is claimed is:

1. A game call of the type having a sound block with an open ended cylindrical bore and a vibratory peg mounted within and extending coaxially from the bore of said sound block, and a sound box on which said peg is moved to produce calls, the improvement comprising:
   a sound board secured to said sound block at the open end of said bore, said sound board having a central aperture through which said peg extends, the diameter of said aperture being less than the diameter of said bore; and
   a groove machined in the front end piece of said sound box so that said sound block nests inside said sound box with said peg resting on said groove.

2. A game call of the type having a sound block with an open ended cylindrical bore and a vibratory peg mounted within and extending coaxially from the bore of said sound block, the improvement comprising:
   a sound board secured to said sound block at the open end of said bore, said sound board having a central aperture through which said peg extends, the diameter of said aperture being less than the diameter of said bore.

3. A game call of the type having a sound block with an open ended cylindrical bore and a vibratory peg mounted within and extending coaxially from the bore of said sound block, and a sound box on which said peg is moved to produce calls, the improvement comprising:
   a groove machined in the front end piece of said sound box so that said sound block nests inside said sound box with said peg resting on said groove.

4. A game call as in claim 1 wherein said sound board is made of cross-banded veneer.

5. A game call as in claim 1 wherein said sound board is made of wood.

6. A game call as in claim 1 wherein said sound board is made of plastic.

7. A game call as in claim 6 wherein said sound board is made of laminated plastic bonded by synthetic resin.

* * * * *